Figure 1:
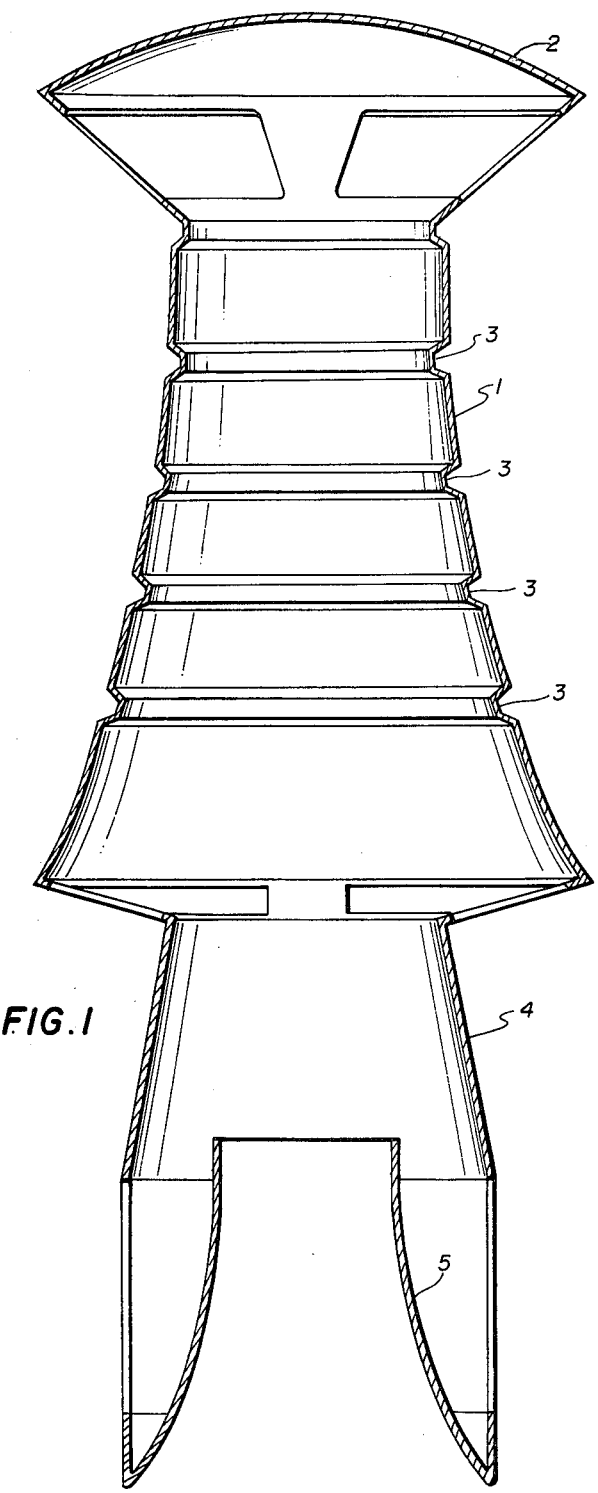

United States Patent [19]

Murphy

[11] 4,138,335

[45] Feb. 6, 1979

[54] SEWAGE AERATING STRUCTURE

[75] Inventor: Declan S. Murphy, Valois, Canada

[73] Assignee: Atara Corporation, Canada

[21] Appl. No.: 812,654

[22] Filed: Jul. 5, 1977

Related U.S. Application Data

[63] Continuation of Ser. No. 675,783, Apr. 12, 1976, abandoned.

[30] Foreign Application Priority Data

Apr. 21, 1975 [CA] Canada .................................. 225103

[51] Int. Cl.² ............................ C02C 1/12; B01F 3/04
[52] U.S. Cl. .................................... 210/170; 210/220; 261/77; 261/123
[58] Field of Search ............... 210/14, 60, 220, 221 R, 210/194, 197, 63 R, 170; 261/77, 119 R, 123, DIG. 75, DIG. 77

[56] References Cited

U.S. PATENT DOCUMENTS

| 179,977 | 7/1876 | Turrettini | 261/77 X |
|---|---|---|---|
| 213,647 | 3/1879 | Fletcher | 261/77 X |
| 708,058 | 9/1902 | Martinson | 261/77 |
| 1,026,578 | 5/1912 | Hammond | 261/77 X |
| 1,026,704 | 5/1912 | Sargent | 261/77 |
| 3,228,526 | 1/1966 | Ciabattari et al. | 261/123 X |
| 3,677,525 | 7/1972 | Schurig et al. | 261/77 X |
| 3,696,029 | 10/1972 | Walker | 210/14 |

FOREIGN PATENT DOCUMENTS 1306729 2/1973 United Kingdom ...................... 261/77

Primary Examiner—Robert H. Spitzer
Attorney, Agent, or Firm—Stevens, Davis, Miller & Mosher

[57] ABSTRACT

A sewage aerating structure comprising a flue of a kind which accelerates sewage upwardly, and an impact plate against which the sewage collides to shatter gas bubbles which are entrained in the fluid. The impact plate is spaced a specific distance above the exit of the flue. The shattering of the bubbles provides a considerably increased quantity thereof, which increases the gas surface area in contact with the sewage, and thus the aerating efficiency.

4 Claims, 5 Drawing Figures

SEWAGE AERATING STRUCTURE

This is a Continuation of application Ser. No. 675,783 filed Apr. 12, 1976, now abandoned.

This invention relates to a structure useful for entraining gas in liquids such as chemical fluids or aerating sewage in sewage lagoons or ponds.

The invention is applicable to aerating or gasification of all types of fluids. However for the purposes of example the following specification will be couched in terms of the aeration of sewage, but the invention is not intended to be, nor should be considered as being limited thereto.

Biological breakdown of sewage is a well known technique for de-toxifying effluent, and a number of different techniques have evolved for entraining gas such as oxygen within the sewage fluid and sludge for fueling the biological breakdown. One of the techniques which is used for aeration is to bubble a gas such as oxygen or air into the sewage from submerged pipes, whereupon some entrainment will occur.

It has been found that the efficiency of aeration will increase with the maximization of the gas surface area in the sewage. The efficiency also increases by mixing. The former technique requires as large a number of bubbles as is possible, and the second depends on agitation of the sewage. Both techniques are sometimes effected by bubbling the gas upwardly through a submerged cylindrical container which has baffles strategically placed either partly across or spiralling in some manner therethrough. The intent of the structure is to cause upward movement of the sewage by the pressure of differential density of gas entrained sewage, and shearing of the gas bubbles upon frictional contact with the baffles. Some agitation of the surrounding sewage has been found to occur, but in the main an unsatisfactory efficiency has resulted.

I have found that the aeration and mixing efficiency of sewage can be increased dramatically by causing the gas-entrained sewage to collide with an impact plate, whereupon not only frictional shearing of the bubbles will occur, but what appears to be shattering, or a similar effect, as well. The result is substantially more finely divided air bubbles, greatly increased in number, and therefore greater surface area, which has been found to substantially increase the aeration efficiency.

The effect which was discovered depends on a particular relationship of distance of the impact plate from a position of maximum velocity of fluid flow of the sewage. The effect is enhanced by utilizing techniques which increase the velocity of the flow of the sewage.

In addition, the impact plate can be shaped in such manner as to cause movement of the sewage after impact downwardly and to the side, so that the bubbles do not immediately rise to the surface of the pond, and remain entrained for longer periods. The downward movement of the sewage further enhances agitation and circulation of the sewage in the surrounding environment of the aerating structure.

In order to obtain the advantages noted above, the present invention of an aerating structure comprises a flue for conducting gas entrained fluids vertically toward the top of a pond, and an impact plate fixed over the exit of the flue. The impact plate is spaced over the exit a maximum distance of 2 times the diametric equivalent of the open area of the exit. The impact plate has a minimum clearance of 1 inch to the ambient. The exit is defined as an orifice having a clear fluid flow path a distance of 2 times its diametric equivalent therebelow.

With the aforenoted impact plate spacing, I have found that the maximum impact and shattering of the gas entrained in the sewage will occur, resulting in an increase in aeration efficiency over prior art aeration structures.

It will sometimes be desirable to provide some shear of the entrained gas by locating one or more holes in the impact plate through which the sewage can flow, for reasons to be described later.

In the preferred embodiment the flue takes the shape of a funnel, the impact plate being spaced the aforenoted distance from the narrowest end of the funnel. The narrow end of the funnel acts as a venturi, the maximum velocity of sewage occuring thereat. The effect of the defined spacing of the impact plate is believed to be such that decrease in velocity of sewage will not occur to a significant extent after exiting the funnel, due to the momentum of the sewage, yet sufficient clearance to the ambient is provided so as not to cause back pressure on the sewage and to allow maximum outflow to the sides of the impact plate.

The velocity of the sewage and the volume agitated thereby can be increased by providing one or more funnels feeding the bottom of the flue. Additional bubble shearing and internal agitation can be provided by adding a multiplicity of spaced circumferential rings indented inwardly in the flue, whereby local eddy currents can be set up.

Figure 2:
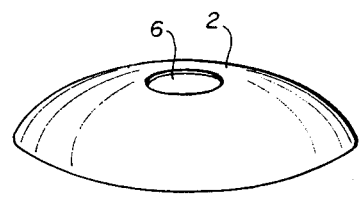
Figure 3:
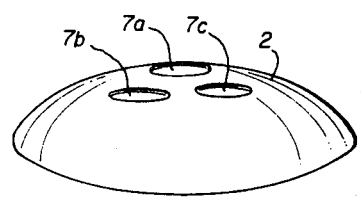
Figure 4:
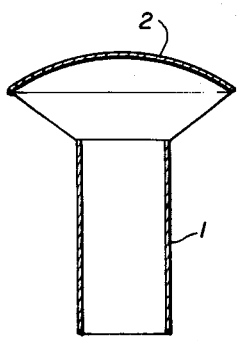
Figure 5:
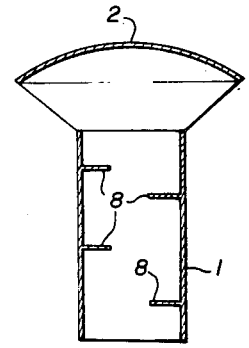

A better understanding of the invention will be obtained by a reference to the preferred embodiment described below, and by reference to the appended drawings, in which:

FIG. 1 is a front elevational section of the invention according to the preferred embodiment, FIG. 2 is a perspective of a second form of impact plate, FIG. 3 is a perspective of a third form of impact plate, FIG. 4 is a schematic in front elevation of a second embodiment, and FIG. 5 is a schematic of the front elevation of a third embodiment of the invention.

Turning first to FIG. 1, the preferred embodiment of the invention is shown in a sectional front elevation. A flue 1 is provided for channelling fluid upwardly toward the top of a sewage pond or the like under the influence of bubbles of gas issuing below. The flue has the characteristic of increasing the upward velocity of sewage movement at its exit. This can be done in a number of ways; one is the provision of a funnel-shaped structure as shown, which has the action of a venturi. Maximum velocity of the upwardly moving sewage will occur at its narrowest exit portion.

Another structure which increases the sewage velocity is a hollow cylinder of dimensions which exhibits a chimney effect. In this case, the length of the cylinder should be twice or more the open area width. The sewage passing through the open area is allowed to accelerate smoothly upwardly, whereupon a relatively high velocity is produced at its exit due to the draught.

It should be understood that a structure which utilizes a gradually widening flue is undesirable. For instance, if a venturi effect is provided at a narrow neck maximum velocity of the sewage will occur at that position, and as the sewage flows upwardly through a gradually widening enclosure, its velocity will be substantially reduced due to the gradual decrease in localized pressure.

The flue should therefore be a narrowing funnel, a constant-diameter cylinder, or an equivalent structure to provide maximum velocity at about its exit.

Fixed over and spaced from the top of the flue is an impact plate 2. The sewage moving at maximum velocity is caused to hit the impact plate, which is believed to shatter the bubbles of gas entrained therein. As noted earlier, the shattering effect appears to provide a greatly increased number of bubbles of gas, with a greater total surface area for contacting the sewage, than occurs as a result of simple shearing as in other prior art sewage aerating structures.

In order to obtain the shattering effect on the impact plate, it has been found that the impact plate must be located from the position of maximum sewage velocity to a maximum distance from the top of the flue about 2 times the diameter of the narrowed sectional area of the flue, its exit. For instance, where in FIG. 1 if the narrowest portion of the neck of flue 1 is 9 inches, the impact plate could be spaced at the narrowest portion, or to a maximum distance at about 18 inches. Outside this range there will be a markedly reduced shattering effect, unless the sewage has been forced upward by pump. Within the prescribed range, it is believed that the momentum of the sewage maintains flow sufficient to cause the desired effect, even though reduced localized pressure is encountered due to the sewage having flowed past the confining portions of the flue.

Of course, the closer the impact plate to the exit, the more back pressure will be exerted on the sewage. A clearance of at least one inch or its equivalent between the impact plate and the ambient is therefore desirable, to relieve the back pressure and allow the impacted sewage to escape around the impact plate.

It is preferred that the impact plate be spherical in shape, in order that sewage will be caused to flow outwardly and downwardly past the edges of the impact plate. This forces some downward movement of the sewage, enhancing circulation of the sewage toward the opposite entrance to the flue, around its outside surface.

Typical dimensions for the sewage aerating unit are length from the wide entrance of the funnel to the top of the impact plate of 30 inches, width of the wide end of the funnel 18 inches, width of narrowest portion of the funnel of 9 inches, and axial spacing from the narrowest portion of the funnel to the impact plate of 7 inches. The radius of curvature of the impact plate can usefully be about 20 inches.

The impact plate can be fixed to the top of the flue by straps or other conventional means. It is important, however, to retain the maximum possible unblocked open area to the ambient between the impact plate and the flue, in order to allow maximum outward flow of sewage, and to minimize locations at which accumulations of solid materials can build up and reduce efficiency.

While above is described the basic preferred embodiment of the invention, there are additional structural additions that can be made to further increase aeration efficiency. A multiplicity of spaced circumferential rings 3 indented inwardly to the flue can be incorporated therewith. This retards parallel flow of the sewage immediately adjacent the side walls thereof. It appears that localized eddy currents are set up, which enhances mixing of gas-entrained fluid directly within the flue. The effective open cross sectional area of the flue, within which acceleration of the sewage due to the chimney effect can occur is reduced somewhat. However, advantageous further mixing of gas within the fluid is obtained. In the example described above, the rings 3 are axially spaced about 4 inches apart, and are indented approximately 1 inch into the interior of the flue.

In operation, gas is bubbled upwardly through and is channeled by the flue 1, and is entrained in the sewage through which it bubbles, reducing its density, and causing it to flow upwardly. Localized eddy currents are set up by the circumferential rings 3 at the periphery of the flue, causing increased entrainment and dispersion of the gas in the sewage. Maximum upward velocity of the sewage occurs at the narrowest neck of the flue 1 due to the venturi effect. The sewage then collides with impact plate 2, whereupon the bubbles of gas appear to become shattered, increasing their number substantially and the efficiency of aeration. The moving sewage is channelled by the surface of impact plate 2 outwardly past its sides whereupon some will flow upwardly toward the surface of the pond after an advantageous delay, and some will circulate downwardly towards the unprocessed or less processed sewage entering the entrance to the flue.

Further means for increasing the velocity of the sewage is provided by funnel 4 which has its narrow exit adjacent and surrounded by the wide entrance to flue 1. Sewage flowing upwardly under the influence or circulation of gas bubbling upwardly through the funnel 4 will undergo an increase in velocity at its narrow end as well as an increase in pressure. As the sewage passes past the narrow end, the pressure is substantially reduced, and sewage is drawn in from the surrounding pond through the space between the funnel 4 and wider entrance of flue 1. The space should provide at least a 1 inch clearance for the earlier noted reasons. Accordingly, the sewage passing up the center of the entire assembly has been given an impetus in velocity, and a broader section of the surrounding portion of the pond will have been circulated into the aeration structure than would be the case without funnel 4.

The above-described action can be further enhanced by use of an additional funnel 5, having its narrow end feeding into the wide end of funnel 4. Its function operates in a similar manner as funnel 4, and increased sewage velocities, and broader enveloping, of possibly stagnant portions of the sewage pond are contacted for circulation. Clearance should be as described earlier.

It may be desirable to reduce back pressure by locating a hole or a group of holes over the central axis of the entire assembly. Turning now to FIG. 2, the impact plate 2 above is shown in perspective. A hole 6 is provided centrally over the axis of the flue 1. In operation, some of the fluid flowing up the flue travels through hole 6 directly into the portion of the sewage pond 6 above the structure.

The hole performs a number of functions. Back pressure which might be caused by the impact plate 2, particularly where it is spaced close to the exit of flue 1 is relieved. The differential movement of sewage through hole 6 from that hitting impact plate 2 and flowing outwardly provides a shearing force on entrained gas, helping to increase the number of bubbles and thus the gas contact surface area with the sewage. Since fluid flows directly directly upwardly through the hole, the momentum of the sewage flowing therethrough is not stopped by the impact plate, and frictional contact with the surrounding sewage which does collide with the impact plate is believed to help maintain its momentum to a maximum extent, maintaining its velocity as much as possible prior to impact. Use of the hole has been found to increase aeration efficiency under certain dimensional relationships.

In FIG. 3, a multiplicity of holes 7a, 7b and 7c are located symmetrically about the central axis of the impact plate. Their function is similar to hole 6 in FIG. 2. Whether one utilizes one hole or a multiplicity of holes will depend on the desired efficiency of the aeration unit, height of pond from the top of the aeration unit, degree of circulation required, and degree of aeration required.

It should be noted that the hole size must be at least 1 inch in diameter, and can typically be between 4 and 6 inches in diameter for the example described where a single hole is used, in order to allow sewage sludge to pass unimpeded therethrough, and also to reduce the probability of a build up of solids. The hole or holes should be wide enough to produce the desired shearing and reduction of back pressure, yet not be so wide that the advantage gained by impact of the sewage on the impact plate would be lost.

Other embodiments of the invention may now become clear to one skilled in the art understanding the description above of the preferred embodiment, and a number will now be described.

A second embodiment is shown schematically in FIG. 4. A cylindrical flue 1 is located with impact plate 2 fixed thereover. As described earlier, when gas is bubbled upwardly through the flue, it is entrained in the sewage, and sewage will flow through the exit and against impact plate 2, with the aforenoted advantages. With a constant diameter non-expanding cylinder, a chimney effect will be obtained, maximizing the velocity of the sewage at its exit. It has been found that the chimney effect will be obtained when the length of the cylinder is at least twice the minimum diameter.

The additional structural techniques for increasing the velocity described with reference to the preferred embodiment can also be used; for instance, one or more funnels feeding the bottom of the cylinder as described in the first embodiment, allowing the circulation of ambient sewage into their wide inlets. The impact plate 2 can have one or more holes therein as described earlier.

In some applications it may be desirable to decrease somewhat the velocity of fluid flow through the flue and increase agitation by the provision of baffles or the like within the flue, as shown in FIG. 5. Shown schematically is flue 1 having baffles 8, which can be of various shapes such as D shaped sections or the like fitted into the cylindrical sides of the cylinder at various levels.

Where narrowed areas within the flue are used, a venturi effect or effect of a narrowed draught in a cylinder will be obtained, with a resultant change in the position of the maximum velocity of the sewage. Indeed, it may be desirable in some structures to locate the impact plate within a confining cylinder. In these cases the flue is defined as one having a clear fluid flow path below a defined exit of at least about two times the diameter of the exit. The impact plate is located a distance above the narrowed exit or an equivalent baffle hole a distance up to 2 times the diametric equivalent of the exit, and may be, as noted earlier, within an extension of the original flue structure above the defined exit.

However in order to obtain the advantages of the invention, a minimum one inch clearance between the impact plate and the ambient, on the walls and exit of the flue should be provided in order to substantially reduce back pressure. The clearance can be varied to suit the dimensions of the entire apparatus, and may be less than 1 inch in miniature systems, particularly where the fluid viscosity is very high.

More than one funnel can also be used in parallel to feed the flue in any of the above described structures to increase velocity of sewage, and resultant aeration efficiency. The funnel 4, in the first described embodiment, can also take the form of a cylinder, and, to maximize aeration efficiency, be fed by a pair of funnels in parallel.

In all the aforenoted structures, the channels through which sewage flows, i.e. holes 6, 7 or the regions between the flue 1 and funnel 4 or funnels 4 and 5 or their interiors must be sufficient to allow circulation of sludgy sewage therethrough. This has been found to be minimally about 1 inch. Therefore the difference in radius between the narrowest portion of funnel 4 and the inlet of flue 1 should be at least 4 inches, as should similarly be the narrow exit of additional funnel 5 with respect to the wide inlet of funnel 4.

While the above description has been directed to a sewage aeration structure which is normally used submerged in arrays in a sewage pond, as noted earlier it is intended also to be used submerged in environments other than sewage. Such environments can be stagnant pools of water, wood processing fluid vats, etc. The term sewage should therefore be interpreted to mean an aqueous environment for which entraination of gases is required.

It has also been found that increased entrainment of air can be obtained by location of the top of the structure above the top surface of the sewage pond. Upon the sewage colliding with the impact plate driven as described earlier, it is deflected outwardly, resulting in wider dispersal and increased air entrainment than when the input plate is submerged. Both of these results are of course highly desirable in sewage pond processing.

Placement of the exit of the aerating structure above the top surface of the sewage is particularly advantageous in shallow ponds, where there may not be enough depth to obtain efficient circulation of the sewage.

Preferably the aeration structure of FIG. 1 is located so that the narrowest portion of the flue 1 is slightly above the surface of the sewage pond.

While above is described a number of embodiments of the invention, other embodiments may now occur to someone skilled in the art. All are considered to be within the scope of the invention as defined by the appended claims.

What is claimed is:
1. A fluid aerating structure comprising
   (a) a flue shaped for accelerating therein gas entrained fluid vertically toward the top of a pond the flue having a multiplicity of spaced circumferential rings indented inwardly thereto, and
   (b) a spherical dish-shaped impact plate having its concave surface centrally positioned facing the exit of the flue for causing interruption of smooth flow of the fluid, and collision and consequent shattering of bubbles of said gas, fixed over the exit of the flue a maximum distance of 2 times the equivalent diameter of the open area of the exit and a minimum clearance of one inch, the exit being defined as an orifice having a clear fluid flow path a distance of 2 times its equivalent diameter therebelow and the flue is in the form of a funnel, having its axis perpendicular to a plane tangent to the apex of the impact plate, its narrower end being located adjacent the concave surface of the impact plate.

2. Means for aerating sewage, comprising (a) a funnel shaped flue, having its narrowest end located slightly above the surface of a body of fluid sewage, and its widest end immersed perpendicularly therebelow, in which the flue has a multiplicity of spaced unperforated circumferential rings indented inwardly thereto and further including a second funnel fixed with its narrow end adjacent and surrounded by the bottom of the flue, and its wide end extending downwardly, the narrow end having a diameter at least two inches less than the diameter of the bottom of the flue, (b) an impact plate positioned and shaped so as to cause collision and consequent shattering of the bubbles of gas in the fluid sewage, fixed over the exit of the flue a maximum distance of two times the equivalent diameter of the open area of the exit and a minimum clearance of one inch, the exit being defined as an orifice having a clear fluid flow path a distance of two times its equivalent diameter therebelow, (c) means for introducing gas into the interior of the flue, for entrainment and movement of sewage upwardly through the flue and subsequent collision with the impact plate above the surface of the body of sewage.

3. A structure as defined in claim 2, including a third funnel fixed with its narrow end adjacent and surrounded by the bottom of the second funnel, and its wide end extending downwardly, the narrow end having a diameter at least two inches less than the diameter of the second funnel, said (c) means being located adjacent and inside the peripheral boundary of the wide end of the third funnel.

4. A fluid aerating structure comprising (a) a flue shaped for accelerating therein gas entrained fluid vertically toward the top of a pond in which the flue has a multiplicity of spaced unperforated circumferential rings indented inwardly thereto, and (b) a spherical dish-shaped impact plate having its concave surface centrally positioned facing the exit of the flue for causing interruption of smooth flow of the fluid, and collision and consequent shattering of bubbles of said gas, fixed over the exit of the flue a maximum distance of 2 times the equivalent diameter of the open area of the exit and a minimum clearance of one inch, the exit being defined as an orifice having a clear fluid flow path a distance of 2 times its equivalent diameter therebelow and the flue is in the form of a funnel, having its axis perpendicular to a plane tangent to the apex of the impact plate, its narrower end being located adjacent the concave surface of the impact plate.

* * * * *